United States Patent
Haynes et al.

(10) Patent No.: US 11,964,769 B2
(45) Date of Patent: Apr. 23, 2024

(54) LIGHT WEIGHT VARIABLE FORCE RESTRAINT

(71) Applicant: GOODRICH CORPORATION, Charlotte, NC (US)

(72) Inventors: Timothy C Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 638 days.

(21) Appl. No.: 17/084,485

(22) Filed: Oct. 29, 2020

(65) Prior Publication Data
US 2021/0047046 A1 Feb. 18, 2021

Related U.S. Application Data

(62) Division of application No. 15/466,217, filed on Mar. 22, 2017, now Pat. No. 10,836,498.

(51) Int. Cl.
| | | |
|---|---|---|
| B64D 25/14 | (2006.01) | |
| B63C 9/22 | (2006.01) | |
| B65D 63/10 | (2006.01) | |
| B63B 27/14 | (2006.01) | |

(52) U.S. Cl.
CPC ............. *B64D 25/14* (2013.01); *B63C 9/22* (2013.01); *B65D 63/10* (2013.01); *B65D 63/1027* (2013.01); *B63B 2027/145* (2013.01)

(58) Field of Classification Search
CPC .... B65D 25/14; B65D 63/10; B65D 63/1027; B63C 9/22; B63B 2027/145; B64D 25/08; B64D 25/14; A62B 1/20
USPC ............................................................. 182/48
See application file for complete search history.

(56) References Cited

U.S. PATENT DOCUMENTS

| | | | | |
|---|---|---|---|---|
| 2,977,145 A | * | 3/1961 | Rifkin ................... | B65D 33/34 292/322 |
| 3,391,771 A | * | 7/1968 | Day ......................... | A62B 1/20 244/905 |
| 3,597,803 A | * | 8/1971 | Van Neil ............ | B65D 63/1027 24/16 PB |

(Continued)

FOREIGN PATENT DOCUMENTS

| | | |
|---|---|---|
| EP | 0110206 | 6/1984 |
| EP | 1900648 | 3/2008 |

(Continued)

OTHER PUBLICATIONS

European Patent Office, European Search Report dated May 24, 2018 in Application No. 18163417.1-1010.

(Continued)

*Primary Examiner* — Daniel P Cahn
*Assistant Examiner* — Shiref M Mekhaeil
(74) *Attorney, Agent, or Firm* — Snell & Wilmer L.L.P.

(57) ABSTRACT

An evacuation system may comprise an evacuation slide configured to be deployed from an aircraft, first strap coupled to the evacuation slide, a second strap coupled to the evacuation slide, and a releasable restraint extending through the first strap and the second strap, the releasable restraint comprising a first stem connected to a first bead and a second stem connected to a second bead, where a diameter of the second stem is different from a diameter of the first stem.

10 Claims, 5 Drawing Sheets

(56) References Cited

U.S. PATENT DOCUMENTS

| | | | | |
|---|---|---|---|---|
| 3,606,939 | A | * | 9/1971 | Summer et al. ........ B64D 25/14 193/25 B |
| 3,830,538 | A | * | 8/1974 | Moberg .................... G09F 3/14 292/322 |
| 3,897,861 | A | * | 8/1975 | Miller .................... B64D 25/14 193/25 B |
| 3,944,023 | A | * | 3/1976 | Fisher ...................... A62B 1/20 244/905 |
| 3,973,645 | A | * | 8/1976 | Dix ........................ B64D 25/14 193/25 B |
| 4,001,919 | A | * | 1/1977 | Moberg ................... G09F 3/037 292/318 |
| 4,235,404 | A | * | 11/1980 | Kraus ...................... F16L 3/233 248/74.3 |
| 4,460,062 | A | * | 7/1984 | Fisher ...................... A62B 1/20 193/25 B |
| 4,506,415 | A | * | 3/1985 | Swift .................... B65D 77/185 24/30.5 R |
| 4,526,262 | A | * | 7/1985 | Malcolm ................ B64D 25/14 193/25 B |
| 4,537,432 | A | * | 8/1985 | Meeks .................... F16L 3/233 292/318 |
| 4,567,977 | A | * | 2/1986 | Fisher .................... B64D 25/14 193/25 B |
| D308,016 | S | * | 5/1990 | Tritton ........................... D8/394 |
| 5,183,301 | A | * | 2/1993 | Lundberg, Jr. ............. G09F 3/14 292/318 |
| 5,337,503 | A | * | 8/1994 | Goby .................... G09F 3/0352 292/318 |
| D376,967 | S | * | 12/1996 | Fuller ............................. D8/14 |
| 5,711,495 | A | * | 1/1998 | Danielson .............. B64D 25/14 244/905 |
| 5,871,180 | A | * | 2/1999 | Hublikar ................ B64D 25/14 193/25 B |
| 6,174,006 | B1 | | 1/2001 | Burt .................. B65D 63/1081 292/307 R |
| 6,449,808 | B1 | * | 9/2002 | Zappa .................... G09F 3/037 24/17 AP |
| 6,499,267 | B1 | * | 12/2002 | Ayrle .................... F16B 13/141 411/33 |
| 6,640,393 | B2 | * | 11/2003 | Wendle .................. B65D 63/18 24/17 AP |
| 6,935,001 | B2 | * | 8/2005 | Barriuso ............... F16L 3/2334 24/17 AP |
| 8,066,108 | B2 | * | 11/2011 | Hentges ................. B64D 25/14 193/25 B |
| 8,480,140 | B2 | * | 7/2013 | Zhang ................... G09F 3/0323 24/16 PB |
| 8,555,467 | B2 | * | 10/2013 | Kelly ................. B65D 63/1081 292/307 R |
| D745,225 | S | * | 12/2015 | Siria-Womach ............. D29/129 |
| D772,492 | S | * | 11/2016 | Kimball ....................... D29/129 |
| 2003/0088949 | A1 | * | 5/2003 | Barriuso ............... F16L 3/2334 24/16 PB |
| 2004/0094361 | A1 | * | 5/2004 | Gronlund ............... B64D 25/14 182/48 |
| 2008/0066265 | A1 | * | 3/2008 | Pilon ..................... F16L 3/2336 24/16 PB |
| 2011/0308047 | A1 | * | 12/2011 | Kelly ................. B65D 63/1081 24/16 PB |
| 2013/0200217 | A1 | * | 8/2013 | Biro ....................... B64D 25/14 244/137.2 |
| 2014/0224937 | A1 | * | 8/2014 | Brown ................... B64D 25/14 244/137.2 |
| 2018/0201380 | A1 | * | 7/2018 | Haynes .................. B64D 25/14 |
| 2018/0327101 | A1 | * | 11/2018 | Haynes ................. B64D 25/14 |
| 2018/0334256 | A1 | * | 11/2018 | Haynes ............. B65D 63/1081 |

FOREIGN PATENT DOCUMENTS

| | | |
|---|---|---|
| WO | 0068921 | 11/2000 |
| WO | 0213165 | 2/2002 |

OTHER PUBLICATIONS

USPTO Pre Interview First Office Action dated Mar. 12, 2019 in U.S. Appl. No. 15/466,217.

USPTO Non Final Office Action dated Jul. 16, 2019 in U.S. Appl. No. 15/466,217.

USPTO First Action Interview Office Action dated Jul. 16, 2019 in U.S. Appl. No. 15/466,217.

USPTO Final Office Action dated Dec. 2, 2019 in U.S. Appl. No. 15/466,217.

USPTO Advisory Action dated Mar. 9, 2020 in U.S. Appl. No. 15/466,217.

USPTO Non Final Office Action dated Jun. 8, 2020 in U.S. Appl. No. 15/466,217.

USPTO Notice of Allowance dated Sep. 16, 2020 in U.S. Appl. No. 15/466,217.

USPTO Corrected Notice of Allowance dated Oct. 15, 2020 in U.S. Appl. No. 15/466,217.

EPO Office Action (Communication pursuant to Article 94(3) EPC) dated Sep. 4, 2019 in Application No. 18163417.1-1010.

European Patent Office, European Office Action dated Jun. 10, 2021 in Application No. 18163417.1.

\* cited by examiner

LIGHT WEIGHT VARIABLE FORCE RESTRAINT

CROSS-REFERENCE TO RELATED APPLICATIONS

This application is a divisional of, claims priority to, U.S. application Ser. No. 15/466,217, now U.S. Pat. No. 10,836,498, filed Mar. 22, 2017 and titled "LIGHT WEIGHT VARIABLE FORCE RESTRAINT," which is hereby incorporated by reference in its entirety.

FIELD

The present disclosure relates to inflatable evacuation slides and, in particular, to restraint release systems and methods for restraining evacuation slides.

BACKGROUND

Emergency evacuation slides may be used to exit an aircraft absent a jet way or other suitable means of egress for passengers. The slides may deploy from a door sill or a side of the aircraft fuselage, for example. The slide deployment is controlled by restraints placed throughout the length of the slide which release in stages in response to internal slide pressure.

SUMMARY

In various embodiments, a releasable restraint for an evacuation system is disclosed. A releasable restraint for an evacuation system may comprise a first stem connected to a first bead, and a second stem connected to a second bead, wherein a diameter of the second stem is different from a diameter of the first stem.

In various embodiments, at least one of a color or a shape of the first bead may indicate a tensile strength of the first stem and may be different from at least one of a color or a shape of the second bead. The releasable restraint may further comprise a plurality of beads including the first bead and the second bead, a plurality of stems connecting the plurality of beads, and a female fastener configured to receive and retain the plurality of beads. The releasable restraint may be in operable communication with the evacuation system and a diameter of a stem connected to a last bead received by the female fastener may define a load associated with breaking the releasable restraint during deployment of the evacuation system.

In various embodiments, the diameter of the first stem may be between 0.09 inches and 0.345 inches. The diameter of the second stem may be between 0.05 inches and 0.13 inches. A ratio of the diameter of the first stem to the diameter of the second stem may be between 6:5 and 7:1. A ratio of a tensile strength of the first stem to a tensile strength of the second stem may be between 3:2 and 25:1. A first tensile strength of the first stem may be between 10 pounds and 50 pounds, and a second tensile strength of the second stem may be between 30 pounds and 150 pounds.

In various embodiments, the releasable restraint may further comprise a third stem connected to a third bead, wherein a diameter of the third stem may be different from the diameter of the first stem and the diameter of the second stem.

In various embodiments, an evacuation system may comprise an evacuation slide, a first strap coupled to the evacuation slide, a second strap coupled to the evacuation slide, and a releasable restraint extending through the first strap and the second strap, the releasable restraint comprising a first stem connected to a first bead and a second stem connected to a second bead, wherein a diameter of the second stem is different from a diameter of the first stem.

In various embodiments, the releasable restraint may further comprise a female fastener configured to receive and retain a plurality of beads of the releasable restraint, the plurality of beads including the first bead and the second bead, a diameter of a stem connected to a last bead received by the female fastener may define a load associated with breaking the releasable restraint during deployment of the evacuation system.

In various embodiments, at least one of a color or a shape of the first bead may indicate the diameter of the first stem and may be different from at least one of a color or a shape of the second bead. The first stem may be configured to break in response to a first tensile force and the second stem may be configured to break in response to a second tensile force greater than the first tensile force. The diameter of the first stem may be between 0.05 inches and 0.13 inches. The diameter of the second stem may be between 0.09 inches and 0.345 inches.

In various embodiments, a method for restraining an evacuation slide may comprise extending a releasable restraint through a first strap coupled to the evacuation slide, and extending the releasable restraint through a second strap coupled to the evacuation slide, the releasable restraint comprising a first stem connected to a first bead, and a second stem connected to a second bead, wherein a diameter of the second stem is different from a diameter of the first stem.

In various embodiments the method may further comprise configuring a female fastener of the releasable restraint to receive and retain a plurality of beads of the releasable restraint, the plurality of beads including the first bead and the second bead, wherein a diameter of a stem connected to a last bead received by the female fastener may define a load associated with breaking the releasable restraint. The method may further comprise indicating at least one of a diameter or a tensile strength of the first stem using at least one of a color or a shape of the first bead. A ratio of the diameter of the first stem to the diameter of the second stem may be between 6:5 and 7:1.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface in a fully deployed position. During deployment, a plurality of restraints may aid in controlling the inflation process of the slide. The restraints may be configured to de-couple in response to internal slide pressure. A releasable restraint is provided in various embodiments. Releasable restraints, according to the present disclosure, may provide weight savings, reduced packaging density, decreased cost, and increased restraint dependability.

Figure 1:
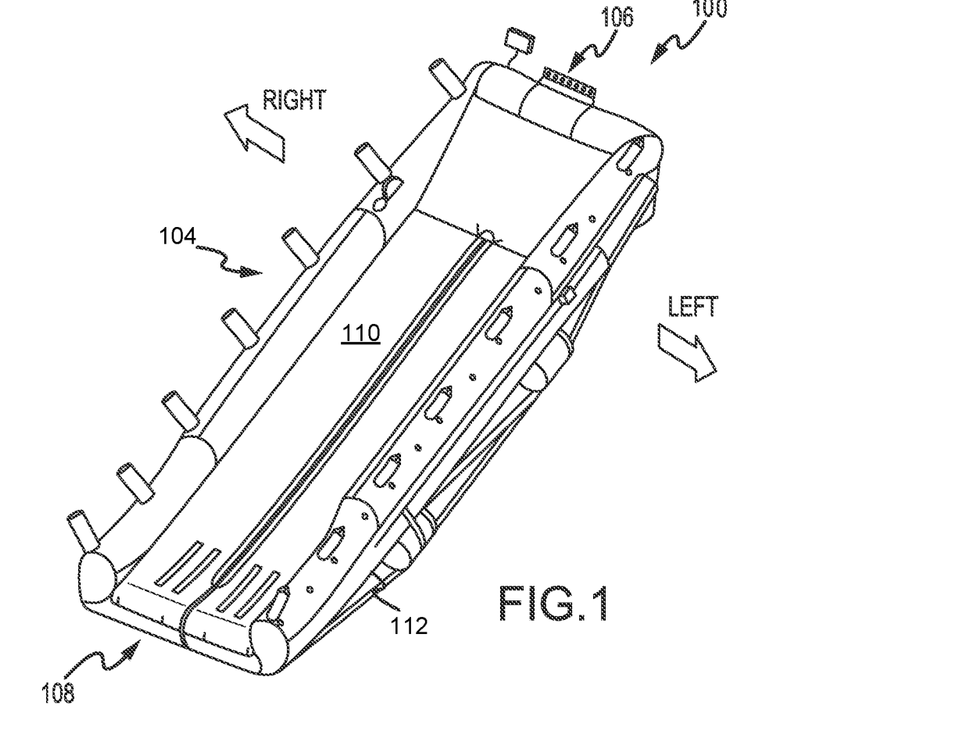
FIG. 1 illustrates a perspective view of an evacuation slide in a deployed position, in accordance with various embodiments.
Figure 2:
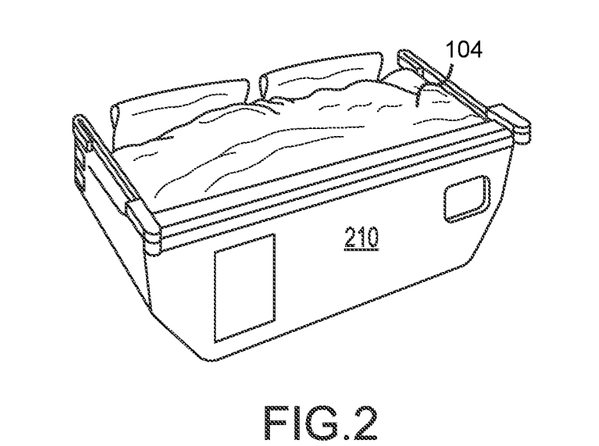
FIG. 2 illustrates a perspective view of an evacuation slide in a stowed position, in accordance with various embodiments.
Figures 3A, 3B:
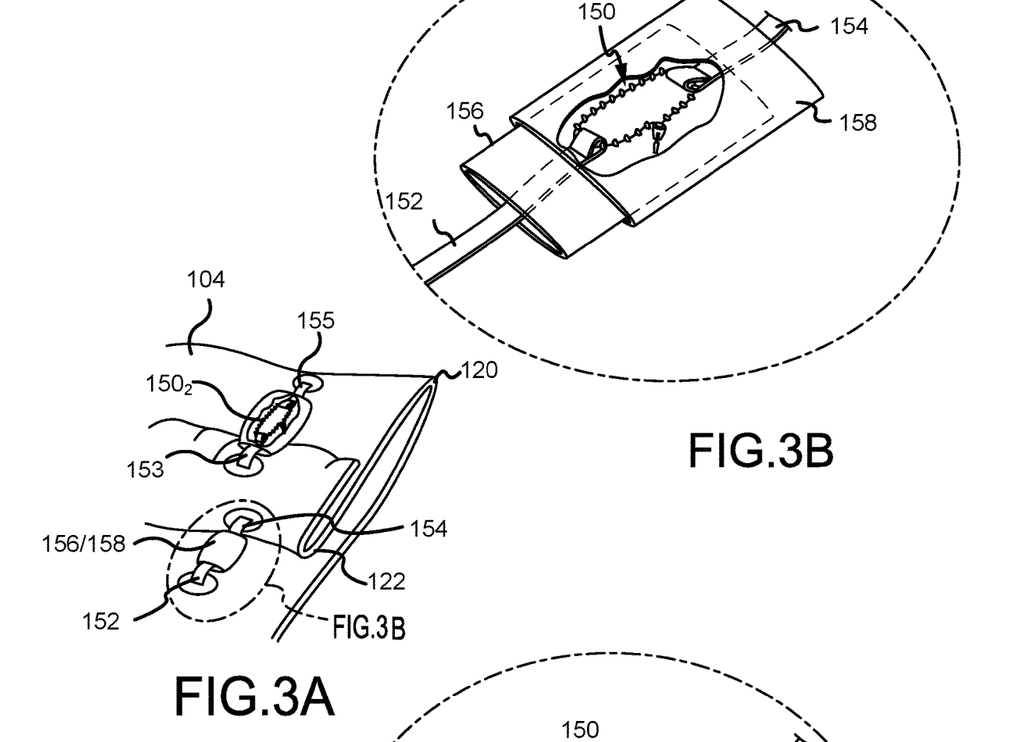
FIGS. 3A, 3B, and 3C illustrate a restraint aiding in retaining an evacuation slide in a folded position, in accordance with various embodiments.
Figure 3C:
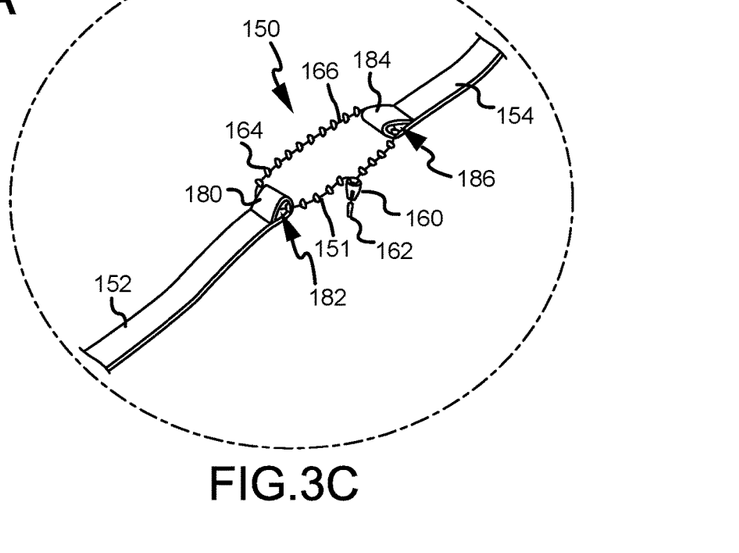
Figure 4:
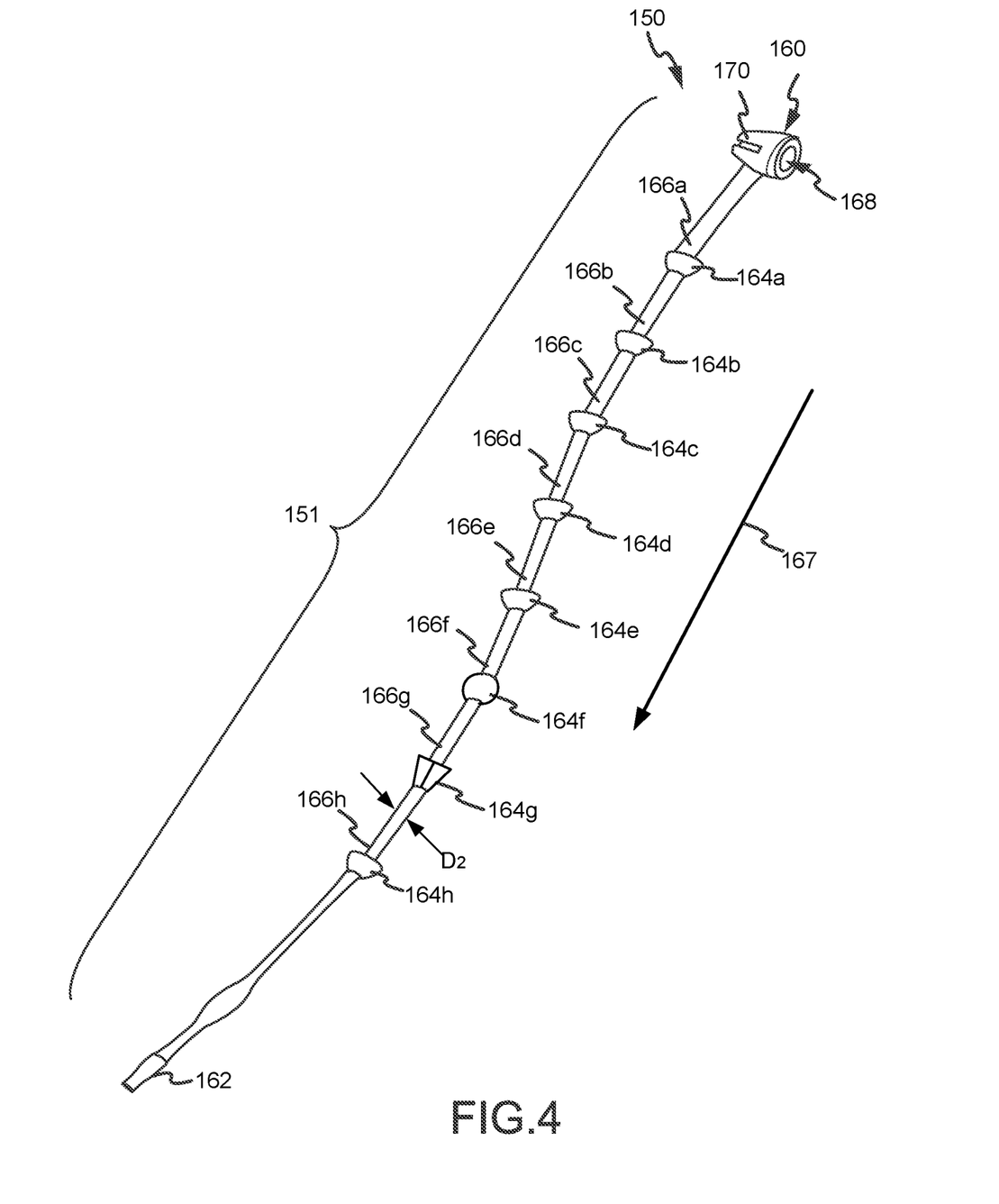
FIG. 4 illustrates a restraint in an unlocked position, in accordance with various embodiments.

With respect to FIG. 2 through FIG. 5, elements with like element numbering, as depicted in FIG. 1, are intended to be the same and will not necessarily be repeated for the sake of clarity. With respect to FIGS. 4, 5A and 5B, elements with like element numbering, as depicted in FIG. 3B and FIG. 3C, are intended to be the same and will not necessarily be repeated for the sake of clarity. With respect to FIGS. 5A and 5B, elements with like element numbering, as depicted in FIG. 4, are intended to be the same and will not necessarily be repeated for the sake of clarity.

With reference to FIG. 1, an evacuation system 100 is illustrated, in accordance with various embodiments. Evacuation system 100 may comprise an evacuation slide 104. Evacuation slide 104 may comprise a head end 106 and a toe end 108 opposite head end 106. Head end 106 may be coupled to an aircraft structure. Evacuation slide 104 may comprise an inflatable slide. FIG. 1 illustrates evacuation slide 104 in an inflated and/or deployed position. Evacuation slide 104 may comprise a sliding surface 110 and an underside surface 112 opposite sliding surface 110. Evacuation slide 104 may comprise a dual lane slide. However, evacuation slide 104 may comprise any number of lanes. Toe end 108 may contact an exit surface in response to evacuation slide 104 being deployed.

With reference to FIG. 2, evacuation slide 104 is illustrated in a stowed and/or packed position. In this regard, evacuation slide 104 may be stowed in a packboard 210. In various embodiments, evacuation slide 104 may be folded in the stowed position. In various embodiments, evacuation slide 104 may be deployed from packboard 210 in response to opening an emergency exit door. Packboard 210 may be coupled to an aircraft in an installed position. Typically, a packboard 210 includes a blow-out panel which opens in response to deployment of evacuation slide 104, and through which the inflatable slide may exit the packboard. In this regard, evacuation slide 104 may be configured to be deployed from an aircraft.

With reference to FIG. 3A and FIG. 3B, evacuation slide 104 is illustrated in a folded position, in accordance with various embodiments. For example, when evacuation slide 104 is in the folded or stowed position, evacuation slide 104 may include a plurality of folds, including first fold 120 and second fold 122. A releasable restraint 150 may aid in maintaining first fold 120 and a second releasable restraint 1502, which is similar to releasable restraint 150, may aid in maintaining second fold 122. Releasable restraints 150 and 1502 may aid in a staged deployment of evacuation slide 104. Evacuation slide 104 may unfold in response to releasable restraints 150 and 1502 separating restraint 150 may aid in a staged deployment of evacuation slide 104. Evacuation slide 104 may unfold in response to releasable restraint 150 separating.

In various embodiments, releasable restraints 150 and 1502 may be configured to separate in response to an internal pressure in evacuation slide 104. For example, a gas cylinder may supply a flow of pressurized fluid to evacuation slide 104 in response to evacuation slide 104 being deployed. Evacuation slide 104 may begin to inflate and an internal pressure of evacuation slide 104 may increase. Releasable restraints 150 and 1502 may maintain evacuation slide 104 in a folded position until the internal pressure has increased above a predetermined threshold value. Releasable restraints 150 and 1502 may separate once the internal pressure of evacuation slide 104 has increased above the predetermined threshold value. In various embodiments, second releasable restraint 1502 may be configured to separate in response to a different (e.g., greater) internal pressure than releasable restraint 150. Evacuation slide 104 may unfold in response to releasable restraints 150 and 1502 separating. In this regard, evacuation slide 104 may fully deploy in response to releasable restraints 150 and 1502 separating. As described in further detail below, releasable restraint 150 may include one or more stems having a first diameter (i.e., first stems) and one or more second stems having a second diameter greater than the first diameter (i.e., second stems). Similarly, second releasable restraint 1502, which is similar to releasable restraint 150, may include one or more stems having the first diameter (i.e., third stems) and one or more stems having the second diameter (i.e., fourth stems).

In various embodiments, releasable restraint 150 may form a loop through which a first strap 152 and a second strap 154 are located. First strap 152 may be coupled between evacuation slide 104 and releasable restraint 150. Second strap 154 may be coupled between evacuation slide 104 and releasable restraint 150. In various embodiments, first strap 152 and/or second strap 154 may comprise a rope, tape, ribbon, webbing, or any other suitable strap. In various embodiments, first strap 152 and/or second strap 154 may comprise nylon, ballistic nylon, polypropylene, polyester, cotton, or any other suitable material. In various embodiments, second releasable restraint 1502 is coupled to a third strap 153 and a fourth strap 155 in a similar manner.

In various embodiments, a first cover 156 and/or a second cover 158 may surround releasable restraint 150. Second cover 158 may surround at least a portion of first cover 156. First cover 156 and second cover 158 may comprise a fabric. For example, first cover 156 and second cover 158 may comprise nylon, ballistic nylon, polypropylene, polyester, cotton, or any other suitable material.

With reference to FIG. 3C, releasable restraint 150, first strap 152, and second strap 154 are illustrated with first cover 156 and second cover 158 omitted for clarity purposes. Releasable restraint 150 may comprise a female fastener 160, a lead end 162, and a plurality of beads 164 connected by a plurality of stems 166 extending along the length and/or body of releasable restraint 150 (i.e., between female fastener 160 and lead end 162). Female fastener 160 is configured to receive and retain lead end 162 and one or more beads 164. Releasable restraint 150 may comprise a single, unibody member. Stated differently, female fastener 160, lead end 162, beads 164, and stems 166 may comprise a single, unibody member. In various embodiments, releasable restraint 150 may comprise a beaded cable tie, also referred to as a beaded zip tie. Releasable restraint 150 may comprise a thermoplastic material. In various embodiments, releasable restraint 150 may comprise nylon. Female fastener 160, lead end 162, beads 164, and/or stems 166 may comprise a thermoplastic material. In various embodiments, female fastener 160, lead end 162, beads 164, and/or stems 166 may comprise nylon. In various embodiments, releasable restraint 150 may comprise poly [imino(1,6-dioxohexamethylene)iminohexamethylene] (i.e., nylon 66) and/or poly(dodecano-12-lactam) (i.e., nylon 12). In various embodiments, releasable restraint 150 may comprise a fluoropolymer. For example, releasable restraint 150 may comprise polytetrafluoroethylene (PTFE). In various embodiments, releasable restraint 150 may comprise a flame retardant.

In various embodiments, an end 180 of first strap 152 may be sewn or otherwise secured to first strap 152 to form a first loop 182. An end 184 of second strap 154 may be sewn or otherwise secured to second strap 154 to form a second loop 186. Loop 182 and loop 186 may couple first strap 152 and second strap 154, respectively, to releasable restraint 150. Lead end 162 of releasable restraint 150 may be extended through first loop 182 and second loop 186 and fastened with one or more beads 164 to female fastener 160.

With reference to FIG. 4, releasable restraint 150 is illustrated in an "unlocked" or "unsecured" configuration, in accordance with various embodiments. In various embodiments, female fastener 160 may include an opening 168 and one or more pawls 170 configured to engage beads 164. In various embodiments, beads 164 may comprise a conical shape. In various embodiments, beads 164 may comprise a spherical or other geometric shape. With momentary reference to FIG. 5A, beads 164 include a diameter D1. Diameter D1 and pawls 170 may be configured to prevent beads 164 that have passed through female fastener 160 in a first direction, (i.e., have traveled through female fastener 160 in the direction of arrow 172) from backing out female fastener 160 in a second direction opposite the first direction (i.e., from passing through female fastener 160 in the direction of arrow 174). In other words, diameter D1 and pawls 170 may be configured so that lead end 162 and beads 164 may only pass through female fastener 160 in one direction (i.e., the direction of arrow 172).

Returning to FIG. 4, releasable restraint 150 may comprise a plurality of stems 166 connecting beads 164. Stems 166 each include a diameter D2. In various embodiments, the diameter D2 of each stem 166 along releasable restraint 150 may be inversely related to a distance the stem is from female fastener 160. In other words, stems 166 decrease in diameter in a direction of arrow 167. In various embodiments, a first stem more proximate to female fastener 160 may include a diameter that is greater than a diameter of a second stem distal to female fastener 160. For example, a diameter of a first stem (e.g., stem 166h) may be less than a diameter of a second stem (e.g., stem 166g), and a diameter of a third stem (e.g., stem 166f) connected to a third bead (e.g., bead 166f) may be greater than a diameter of the second stem and less than a diameter of a fourth stem (e.g., stem 166e) connected to a fourth bead (e.g. bead 164e), and a diameter of a fifth stem (e.g., stem 166d) connected to a fifth bead (e.g., bead 164d) may be greater than the diameter of the fourth stem, etc.

In various embodiments, each stem 166 may include a diameter that is different from a diameter of the stems directly adjacent to it. In other words, a diameter of stem 166a may be greater than a diameter of stem 166b; a diameter of stem 166b may be greater than a diameter of stem 166c and less than a diameter of stem 166a; a diameter of stem 166c may be greater than a diameter of stem 166d and less than a diameter of stem 166b, and so on.

The diameter of each stem 166 may be directly related to the tensile force and/or load associated with breaking break the stem, such that a greater tensile force and/or load is associated with breaking stems having a larger diameter. For example, a greater tensile force and/or load may be associated with breaking stem 166a than is associated with breaking stem 166b or than is associated with breaking stem 166c. In various embodiments, a first stem proximate to female fastener 160 (e.g., stem 166c) may break at a load of between 80 pounds and 150 pounds (i.e., between 356 N and 667 N) and a second stem more distal to female fastener 160 than the first stem (e.g., stems 166d-166h) may break at a load of between 10 pounds and 50 pounds (i.e., between 44 N and 222 N).

In various embodiments, stems 166 may be grouped by diameter and/or tensile strength. For example, a first group of stems 166 proximate to female fastener 160 (e.g., stems 166a, 166b, and 166c) may have a same first diameter and/or same first tensile strength, and a second group stems more distal to female fastener 160 than the first group of stems (e.g., stems 166d, 166e, and 166f) may have a same second diameter and/or same second tensile strength, and a third group stems more distal to female fastener 160 than the first group of stems and the second group of stems (e.g., stems 166g and 166h) may have a same third diameter and/or a same third tensile strength, and the first diameter and the first tensile strength are greater than the second diameter and the second tensile strength, respectively, and the second diameter and the second tensile strength are greater than the third diameter and third tensile strength, respectively.

In various embodiments, a first shape and/or a first color of a first bead (e.g., bead 164c) of releasable restraint 150 may indicate a tensile strength of the stem (e.g., stem 166*c*) connected to the first bead, and a second shape and/or a second color of a second bead (e.g., 164*g*) may indicate a tensile strength of the stem connected to the second bead. For example, a first shape (e.g., conical) and/or a first color (e.g., red) of a bead 164*c* may indicate a tensile force (e.g., 60 pounds (267 N)) associated with separating stem 166*c*, and a second shape (e.g., spherical) and/or a second color (e.g., green) of bead 164*f* may indicate a tensile force (e.g., 15 pounds (68 N)) associated with separating stem 166*f*.

In various embodiments, a first cross-sectional shape and/or a first color of a first stem may indicate a tensile strength of the first stem, and a second cross-sectional shape and/or a second color of a second stem may indicate a tensile strength of the second stem. For example, a first cross-sectional shape (e.g., circular) and/or a first color (e.g., red) of stem 166*c* may indicate a tensile force (e.g., 300 pounds (1334 N)) associated with separating stem 166*c*, and a second cross-sectional shape (e.g., triangular) and/or a second color (e.g., green) of stem 166*g* may indicate a tensile force (e.g., 100 pounds (445 N)) associated with separating stem 166*g*.

In various embodiments, a first shape and/or a first color of a first bead may indicate a diameter of the stem connected to the first bead, and a second shape and/or a second color of a second bead may indicate a diameter of the stem connected to the second bead. For example, a first shape (e.g., conical) and/or a first color (e.g., red) of bead 164*c* may indicate a diameter (e.g., 0.13 inches (3.30 mm)) of stem 166*c*, and a second shape (e.g., triangular, hexagonal, etc.) and/or a second color (e.g., green) of bead 164*g* may indicate a diameter (e.g., 0.09 inches (2.29 mm)) of stem 166*g*.

In various embodiments, a first cross-sectional shape and/or a first color of a first stem may indicate a diameter of the first stem, and a second cross-sectional shape and/or a second color of a second stem may indicate a diameter of the second stem. For example, a first cross-sectional shape (e.g., circular) and/or a first color (e.g., red) of stem 166*c* may indicate a diameter (e.g., 0.345 inches (8.763 mm)) of stem 166*c*, and a second cross-sectional shape (e.g., triangular) and/or a second color (e.g., green) of stem 166*g* may indicate a diameter (e.g., 0.09 inches (2.29 mm)) of stem 166*g*.

In various embodiments, a ratio of a tensile strength of a first stem (e.g., stem 166*b*) to a tensile strength of a second stem (e.g. stem 166*g*), more distal to the female fastener 160 than the first stem, may be between 12:11 and 25:1. In various embodiments, a ratio of a tensile strength of a first stem (e.g., stem 166*b*) to a tensile strength of a second stem (e.g. stems 166*g*), more distal to the female fastener 160 than the first stem, may be between 8:7 and 10:1. In various embodiments, a ratio of a tensile strength of a first stem (e.g., stem 166*b*) to a tensile strength of a second stem (e.g., 166*g*), more distal to the female fastener 160 than the first stem, may be between 3:2 and 7:1. In various embodiments, a ratio of a tensile strength of a first stem (e.g., stem 166*b*) to a tensile strength of a second stem (e.g., 166*g*), more distal to the female fastener 160 than the first stem, may be between 3:2 and 4:1.

In various embodiments, a ratio of a diameter of a first stem (e.g., stem 166*c*) to a diameter of a second stem (e.g., stem 166*h*), more distal to the female fastener 160 than the first stem, may be between 13:12 and 8:1. In various embodiments, a ratio of a diameter of a first stem (e.g., stem 166*c*) to a diameter of a second stem (e.g., stem 166*h*), more distal to the female fastener 160 than the first stem, may be between 6:5 and 7:1. In various embodiments, a ratio of a diameter of a first stem (e.g., stem 166*c*) to a diameter of a second stem (e.g., stem 166*h*), more distal to the female fastener 160 than the first stem, may be between 6:5 and 2:1. In various embodiments, a ratio of a diameter of a first stem (e.g., stem 166*c*) to a diameter of a second stem (e.g., stem 166*h*), more distal to the female fastener 160 than the first stem, may be between 6:5 and 9:5.

In various embodiments, a first ratio of a tensile strength of a first stem (e.g., stem 166*b*) to a tensile strength of a second stem (e.g., stem 166*c*) adjacent to the first stem may be less than a second ratio of the tensile strength of the first stem to a tensile strength of a third stem (e.g., stem 166*g*) more distal to female fastener 160 than the first stem and second stem. In various embodiments, a first ratio of a tensile strength of a first stem (e.g., stem 166*b*) to a tensile strength of a second stem (e.g., stem 166*c*) adjacent to the first stem may be between 8:7 and 2:1, and a second ratio of the tensile strength of the first stem to a tensile strength of a third stem (e.g., stem 166*g*) more distal to female fastener 160 than the first stem and second stem may be between 2:1 and 25:1. For example, a first ratio of a tensile strength of stem 166*b* to a tensile strength of stem 166*c* may be 6:5 and a second ratio of the tensile strength of stem 166*b* to a tensile strength of stem 166*g* may be 7:1.

In various embodiments, a first ratio of a diameter of a first stem (e.g., stem 166*b*) to a diameter of a second stem (e.g., stem 166*c*) adjacent to the first stem may be less than a second ratio of the diameter of the first stem to a diameter of a third stem (e.g., stem 166*g*) more distal to female fastener 160 than the first stem and the second stem. In various embodiments, a first ratio of a diameter of a first stem to a diameter of a second stem adjacent to the first stem may be between 13:12 and 6:5, and a second ratio of the diameter of the first stem to a diameter of a third stem (e.g., stem 166*g*) more distal to female fastener 160 than the first stem and second stem may be between 7:5 and 8:1. For example, a first ratio of a diameter of stem 166*b* to a diameter of stem 166*c* may be 12:11 and a second ratio of the diameter of stem 166*b* to a diameter of stem 166*g* may be 3:1.

Figure 5A:
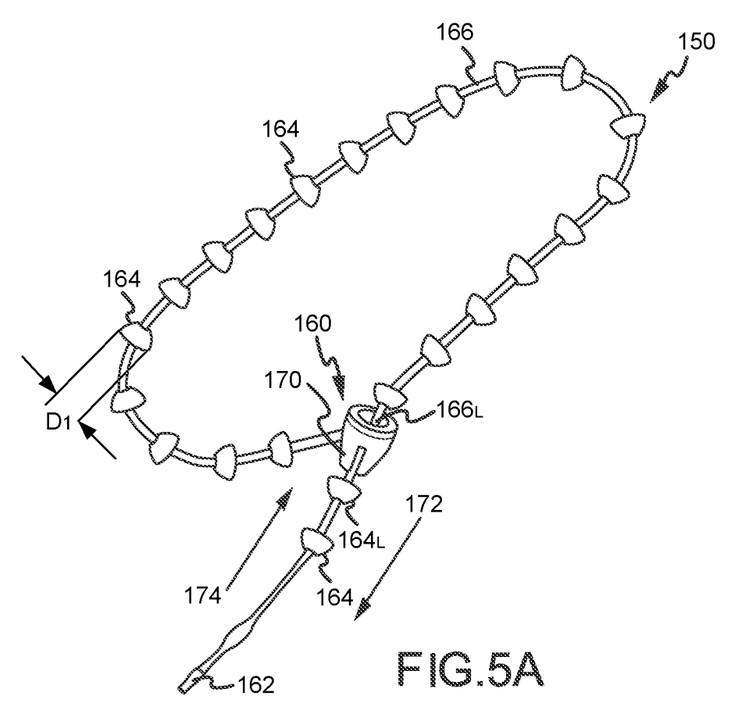
FIGS. 5A and 5B illustrate a restraint in a locked position and in a broken position, respectively, in accordance with various embodiments.

With reference to FIG. 5A, releasable restraint 150 is illustrated in a locked position, in accordance with various embodiments. Lead end 162 and one or more beads 164 may be inserted through and extend from female fastener 160. Beads 164 may engage with female fastener 160 and/or pawl 170. A load associated with breaking releasable restraint 150 may be determined and/or defined by a tensile strength of the stem 166L connected to the last bead 164L through female fastener 160.

Figure 5B:
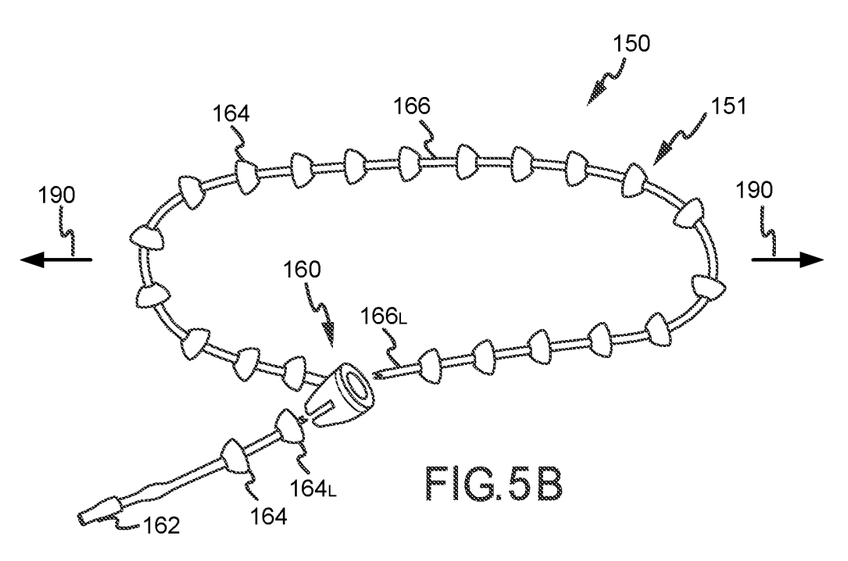

With reference to FIG. 5B, releasable restraint 150 is illustrated in a separated or "broken" position, in accordance with various embodiments. The stem 166L connected to the last bead 164L through female fastener 160 may separate or break in response to a predetermined force and/or load, such as tensile force 190. Lead end 162 and the beads 164 located through female fastener 160 may separate from the beads 164 not located through female fastener 160 in response to tensile force 190. In various embodiments, stems 166 may comprise frangible members. Tensile force 190 may be generated in response to an internal pressure of the evacuation slide 104, with momentary reference to FIG. 3A, for example during inflation. In this regard, with momentary reference to FIG. 3B, releasable restraint 150 may be in operable communication with evacuation slide 104. In various embodiments, the stem 166L connected to the last bead 164L located through female fastener 160 may define a weakest portion of releasable restraint 150 and as such define the point of separation of releasable restraint 150 when loaded during deployment of the evacuation slide 104. In this regard, the stem 166L connected to the last bead 164L located through female fastener 160 may be configured to withstand forces below a threshold value and may be configured to separate in response to forces above the threshold value.

In various embodiments, a number of beads 164 received by female fastener 160 may indicate a load associated with breaking releasable restraint 150. For example, with momentary reference to FIG. 4, a tensile strength of the stems 166 connected to adjacent beads 164 may differ by, for example, 10 pounds (44 N), such that stem 166h may separate in response to a load of, for example, 20 pounds (89 N), and stem 166g may separate in response to a load of, for example, 30 pounds (133 N), and stem 166f, may separate in response to a load of, for example, 40 pounds (178 N), and stem 166e, may separate in response to a load of, for example, 50 pounds (222 N), etc. In this regard, returning to FIG. 5B, the more beads 164 located through female fastener 160, the greater the force and/or load, associated with breaking releasable restraint 150.

In various embodiments, a number of beads 164 received by female fastener 160 may indicate a diameter of the stem 166L associated with breaking releasable restraint 150. For example, with momentary reference to FIG. 4, a diameter of adjacent stems 166 may differ by, for example, 0.01 inches (0.245 mm), such that stem 166h may have a diameter of, for example, 0.05 inches (1.27 mm), and stem 166g may have a diameter of, for example, 0.06 inches (1.524 mm), and stem 166f, may have a diameter of, for example, 0.07 inches (1.778 mm), and stem 166e, may have a diameter of, for example, 0.08 inches (2.032 mm), etc. In this regard, returning to FIG. 5B, the more beads 164 located through female fastener 160, the larger a diameter of the stem 166L connected to the last bead 164L through female fastener 160, and thus the larger a diameter of the stem 166L associated with a breaking of releasable restraint 150.

In various embodiments, stems 166 along releasable restraint 150 may vary in diameter such that releasable restraint 150 may be configured, based on the last bead 164L extended through female fastener 160, to separate in response to a tensile force 190 of between 10 pounds and 250 pounds (i.e., between 44 N and 1112 N), and in various embodiments in response to a tensile force 190 of between 10 pounds and 150 pounds (i.e., between 44 N and 667 N), and in various embodiments, in response to a tensile force of between 10 pounds and 70 pounds (i.e., between 44 N and 311 N). In various embodiments, stems 166 along releasable restraint 150 may vary in diameter and/or tensile strength such that releasable restraint 150 may be configured, depending on the last bead 164L extended through female fastener 160 (and thus the stem 166L connected to the last bead 164L located through female fastener 160), to separate in response to any suitable tensile force 190 greater than zero.

In various embodiments, a plurality of releasable restraints 150 may be provided in parallel to withstand a predetermined force. For example, if it is desired that a restraint breaks at about 600 pounds (i.e., about 2669 N), two releasable restraints configured to withstand 300 pounds (1334 N) may be provided in parallel to withstand the 600 pound (2669 N) force. In response to a tensile force greater than 600 pounds (i.e., greater than 3669 N), the two restraints may break, allowing an evacuation system to fully deploy.

Figure 6:
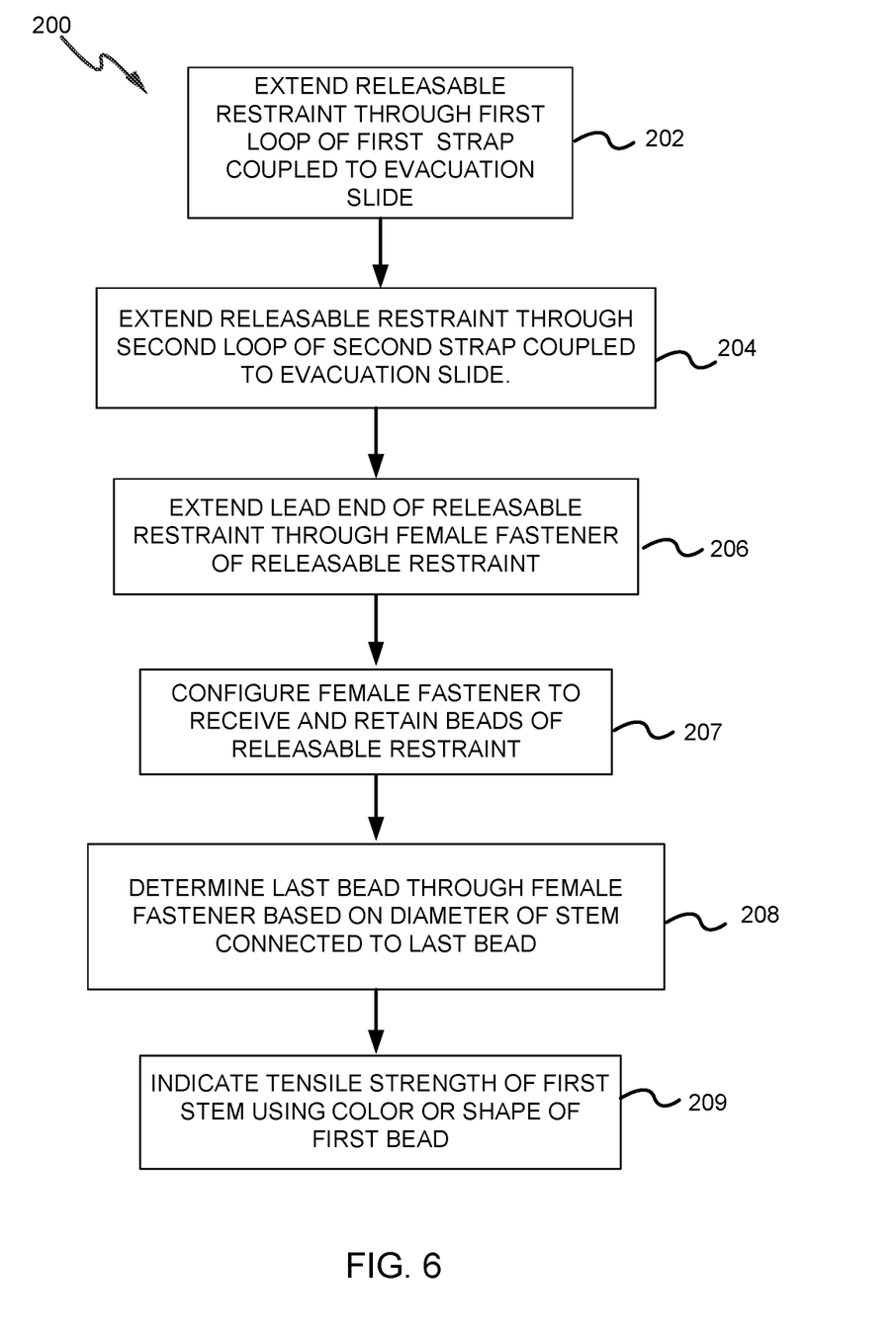
FIG. 6 illustrates a method for restraining an evacuation slide, in accordance with various embodiments.

With reference to FIG. 6, a method 200 for restraining an evacuation slide is provided, in accordance with various embodiments. Method 200 includes extending a releasable restraint through a first loop of a first strap coupled to an evacuation slide (step 202). Method 200 includes extending the releasable restraint through a second loop of a second strap coupled to the evacuation slide (step 204). Method 200 may include extending a lead end of the releasable restraint through a female fastener of the releasable restraint (step 206). Method 200 may include configuring the female fastener to receive and retain beads of the releasable restraint (step 207). Method 200 may include determining a last bead to extend through the female fastener based on a diameter of a stem connected to the last bead (step 208). Method 200 may include indicating a tensile strength of a first stem using at least one of a color or a shape of a first bead (step 209).

In various embodiments, with combined reference to FIG. 3A, FIG. 3B, FIG. 4, FIG. 5B, and FIG. 6, step 202 may include extending releasable restraint 150 through first loop 182 formed by first strap 152 coupled to evacuation slide 104. Step 204 may include extending releasable restraint 150 through second loop 186 formed by second strap 154 coupled to the evacuation slide 104. Step 206 may include extending lead end 162 of releasable restraint 150 through female fastener 160 of releasable restraint 150. Step 207 may include configuring female fastener 160 to receive and retain beads 164. Step 208 may include determining a last bead 164L of releasable restraint 150 to extend through female fastener 160 of releasable restraint 150 based on a diameter of a stem 166L connected to the last bead 164L. Step 209 may include indicating a tensile strength of a first stem (e.g., 166c) using at least one of a color or a shape of a first bead (e.g., bead 164).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for restraining an evacuation slide, comprising:
    extending a releasable restraint through a first strap coupled to the evacuation slide, the releasable restraint comprising,
        a lead end;
        a female fastener opposite the lead end;
        a first bead;
        a second bead adjacent to the first bead;
        a first stem connecting the first bead and the second bead;
        a third bead adjacent to the second bead;
        a second stem connecting the second bead and the third bead, wherein a diameter of the second stem is greater than a diameter of the first stem such that a first tensile load associated with breaking the first stem is less than a second tensile load associated with breaking the second stem, and wherein the second stem is located more proximate the female fastener as compared to the first stem;
        a third stem connected to the third bead; and
        a fourth bead and a fifth bead connected by a fourth stem, wherein the fifth bead is adjacent to the fourth bead, and wherein a diameter of the fourth stem is greater than the diameter of the second stem such that a third tensile load associated with breaking the fourth stem is greater than the second tensile load associated with breaking the second stem, and wherein the fourth stem is located more proximate the female fastener as compared to the third stem, and wherein the female fastener is configured to receive and retain the lead end and at least one of the first bead, the second bead, the third bead, the fourth bead, or the fifth bead; and
    extending the releasable restraint through a second strap coupled to the evacuation slide.

2. The method of claim 1, further comprising locating the lead end and at least one bead of the first bead, the second bead, the third bead, the fourth bead, or the fifth bead through the female fastener.

3. The method of claim 1, further comprising:
    determining a desired load associated with breaking the releasable restraint; and
    determining a bead of the first bead, the second bead, the third bead, the fourth bead, or the fifth bead to be a last bead received by the female fastener based on the desired load associated with breaking the releasable restraint, wherein a last diameter of a last stem connected to the last bead received by the female fastener defines an actual load associated with breaking the releasable restraint such that the actual load associated with breaking the releasable restraint corresponds to the desired load associated with the breaking the releasable restraint.

4. The method of claim 1, wherein at least one of a color or a shape of the first bead indicates at least one of the diameter of the first stem or the first tensile load associated with breaking the first stem.

5. The method of claim 1, wherein a ratio of the diameter of the first stem to the diameter of the second stem is between 6:5 and 7:1.

6. A method for restraining an evacuation slide, comprising:
    locating a first releasable restraint through a first strap and a second strap of the evacuation slide; and
    locating a second releasable restraint through a third strap and a fourth strap of the evacuation slide,
    wherein the first releasable restraint comprises:
        a plurality of first beads;
        a plurality of first stems connecting the plurality of first beads, wherein each first stem of the plurality of first stems extends between a pair of first beads of the plurality of first beads, and wherein each first stem of the plurality of first stems has a first diameter;
        a plurality of second beads;
        a first female fastener configured to receive and retain at least one bead of the plurality of first beads or the plurality of second beads; and
        a plurality of second stems connecting the plurality of second beads, wherein each second stem of the plurality of second stems extends between a pair of second beads of the plurality of second beads, and wherein each second stem of the plurality of second stems has a second diameter, and wherein the first diameter is less than the second diameter, and wherein a first tensile load associated with breaking one of the plurality of first stems is less than a second tensile load associated with breaking one of the plurality of second stems, and wherein the first releasable restraint is attached to the first strap and the second strap such that the first releasable restraint is configured to break at the first tensile load, and
    wherein the second releasable restraint comprises:
        a plurality of third beads;
        a plurality of third stems connecting the plurality of third beads, wherein each third stem of the plurality of third stems extends between a pair of third beads of the plurality of third beads, and wherein each third stem of the plurality of third stems has a third diameter, the third diameter being equal to the first diameter of the plurality of first stems of the first releasable restraint;
        a plurality of fourth beads;
        a second female fastener configured to receive and retain at least one bead of the plurality of third beads or the plurality of fourth beads; and
        a plurality of fourth stems connecting the plurality of fourth beads, wherein each fourth stem of the plurality of fourth stems extends between a pair of fourth beads of the plurality of fourth beads, and wherein each fourth stem of the plurality of fourth stems has a fourth diameter, the fourth diameter being equal to the second diameter of the plurality of second stems of the first releasable restraint, and wherein the second releasable restraint is attached to the third strap and the fourth strap such that the second releasable restraint is configured to break at the second tensile load.

7. The method of claim 6, wherein at least one of a color or a shape of one of the plurality of first beads indicates the first tensile load associated with breaking the plurality of first stems and is different from at least one of a color or a shape of the plurality of second beads.

8. The method of claim 6, wherein at least one of a color or a shape of the plurality of first stems is different from at least one of a color or a shape of the plurality of second stems.

9. The method of claim 6, wherein the first releasable restraint further comprises a plurality of inclusive stems connecting a plurality of inclusive beads, the plurality of inclusive stems including the plurality of first stems and the plurality of second stems, and the plurality of inclusive beads including the plurality of first beads and the plurality of second beads and wherein each stem of the plurality of inclusive stems is configured to be frangible at a selected tensile load.

10. The method of claim 9, wherein the selected tensile load increases along each of the plurality of inclusive stems of the first releasable restraint and the second releasable restraint in a direction extending from a lead end toward the first and second female fasteners respectively.

* * * * *